(12) United States Patent
Odachi et al.

(10) Patent No.: US 6,237,428 B1
(45) Date of Patent: May 29, 2001

(54) MAGNETOSTRICTIVE TORQUE SENSOR

(75) Inventors: Yasuharu Odachi; Yoshitaka Kouketsu; Katsufumi Tanaka; Yukio Yoshioka; Hiroshi Fukasaku, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/088,587

(22) Filed: Jun. 2, 1998

(30) Foreign Application Priority Data

Jun. 6, 1997 (JP) .................................................. 9-149517

(51) Int. Cl.⁷ ...................................................... G01L 3/02
(52) U.S. Cl. ...................................................... 73/862.333
(58) Field of Search .................... 73/862.331, 862.336

(56) References Cited

U.S. PATENT DOCUMENTS 4,996,890 * 3/1991 Taniguchi et al. ................. 73/862.33
5,578,767 * 11/1996 Chikaraishi et al. .......... 73/862.331

FOREIGN PATENT DOCUMENTS 62-203027    9/1987  (JP) .

* cited by examiner

*Primary Examiner*—Benjamin R. Fuller
*Assistant Examiner*—Jewel V. Thompson
(74) *Attorney, Agent, or Firm*—Morgan & Finnegan, LLP

(57) ABSTRACT

An improved torque sensor for detecting the direction and the magnitude of a torque applied to a shaft. The sensor includes a magnetostrictive layer, a pair of bearings, a stator and two nuts. The sleeve is fixed the circumference of the shaft. The layer has a magnetostriction effect in accordance with torque applied to the shaft. A pair of collars are fixed to the shaft at opposite ends of the layer. The bearings are connected to the shaft. Each bearing contacts one of the collars. The stator accommodates two pairs of coils. Each coil pair includes an exciting coil and a detecting coil. The coils surround and face the magnetostrictive layer. The axial position of the stator is determined by the bearings. Each nut is threaded to a threaded portion fixed to the shaft and presses one of the bearings against the corresponding collar. Accordingly, the axial position of the stator is determined.

17 Claims, 6 Drawing Sheets

MAGNETOSTRICTIVE TORQUE SENSOR

BACKGROUND OF THE INVENTION

The present invention relates to a torque sensor. More particularly, the present invention pertains to magnetostrictive torque sensors that are attached, for example, to a drive shaft or a steering shaft of vehicles to detect the magnitude of torque applied to the shaft and the rotational direction and rotational amount of the shaft.

FIG. 11 is a cross-sectional view illustrating a prior art magnetostrictive torque sensor 81 provided on a shaft 80. The sensor 81 includes a sleeve 82 fitted about the shaft 80. A magnetostrictive layer 83 is formed on the circumference of the sleeve 82. The layer 83 is located at the axial center portion of the sleeve 82. The layer 83 is divided into two magnetostrictive segments 83A, 83B at the axial center of the sleeve 82 by an imaginary plane perpendicular to the axis of the shaft 80. Grooves are formed in the outer surfaces of the layer 83. Half of the grooves are formed in the segment 83A and the other half are formed in the segment 83B. The grooves on one of the segments 83A, 83B are inclined by forty-five degrees relative to the axis of the sleeve 82, whereas the grooves on the other segment are inclined by minus forty five degrees. The grooves on the segment 83A and the grooves on the segment 83B do not intersect with each other.

Bearings 84 are press fitted about the sleeve 82. The bearings 84 support a cylindrical stator 85 to be rotatable relative to the sleeve 82. Exciting coils 86A, 86B and detecting coils 87A, 87B are located in the inner wall of the stator 85. The coils 86A, 87A face the segment 83A and the coils 86B, 87B face the segment 83B.

The segments 83A, 83B are strained in accordance with the magnitude and direction of torque acting on the shaft 80. The strain of the segments 83A, 83B changes the permeability of the segments 83A, 83B. Changes in the permeability cause voltages induced by the detecting coils 87A, 87B to differ from each other. The value of the torque applied to the shaft 80 is represented by the magnitude of the voltage difference. The direction of the torque is represented by the sign of the subtraction result of the voltages. The magnetostrictive sensor detects the torque based on the difference between the output voltages of the coils 87A, 87B.

With no torque applied on the shaft 80, the segments 83A and 83B have the same permeability. However, if the segments 83A, 83B are axially displaced relative to the corresponding coil pairs 86A, 87A and 86B, 87B, magnetic fluxes through the detecting coils 87A, 87B are changed. As a result, the voltage of the coils 87A, 87B become different even if there is no torque applied to the shaft 80. This results in an erroneous detection of torque. In other words, the detection accuracy of the torque sensor 81 is degraded.

Accordingly, the torque sensor 81 has annular collars 88 for preventing the segments 83A, 83B from being displaced relative to the coil pairs 86A, 87A and 86B, 87B. The collar 88 are formed on the circumference of the sleeve 82 and prevent the bearings 84, which are press fitted about the sleeve 82, from moving axially. The bearings 84 hold the stator 85 thereby restricting the axial movement of the stator 85. As a result, the positions of the coil pairs 86A, 87A and 86B, 87B are fixed relative to the segments 83A, 83B.

However, each element in the torque sensor 81 has a dimensional error that is created during manufacture process. Thus, the diameter of the sleeve 82 may be slightly smaller than the inner diameter of the bearings 84. In this case, the bearings 84 are not firmly fitted about the sleeve 82. This results in the bearings 84 being slightly inclined relative to the sleeve 82. In other cases, the bearings 84 separate from the collars 88 during use of the sensor 81. As a result, the coil pairs 86A, 87A and 86B, 87B are axially displaced from the predetermined positions in relation with the segments 83A, 83B. This degrades the detection accuracy of the sensor 81.

In order to cope with the above drawbacks, a construction including snap rings fitted about the sleeve 82 is proposed. Specifically, a groove is formed in the sleeve 82 at a position adjacent to and axially outside of each bearing 84. A snap ring is fitted to each groove. Each snap ring and the corresponding bearing 84 fix the position of the corresponding bearing 84. However, the width of the grooves and thickness of the snap ring include dimensional errors. The errors may result in the bearings 84 separating from the collars 88. As a result, the position of the stator 85 is displaced relative to the sleeve 82.

SUMMARY OF THE INVENTION

Accordingly, it is an objective of the present invention to provide a magnetostrictive torque sensor that prevents a stator having exciting and detecting coils from moving axially and thus accurately maintains the positions of the coils relative to corresponding magnetostrictive layer thereby improving the torque detection accuracy.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 4(*b*) is a side view illustrating the washer of FIG. 4(*a*);

FIG. 8(*b*) is a front view illustrating a washer having outer teeth;

FIG. 9(*b*) is a perspective view illustrating a second nut according to the embodiment of FIG. 9(*a*);

DETAILED DESCRIPTION OF THE PREFERRED EMBODIMENTS

A first embodiment of the present invention will now be described with reference to FIGS. 1 and 2.

Figure 1:
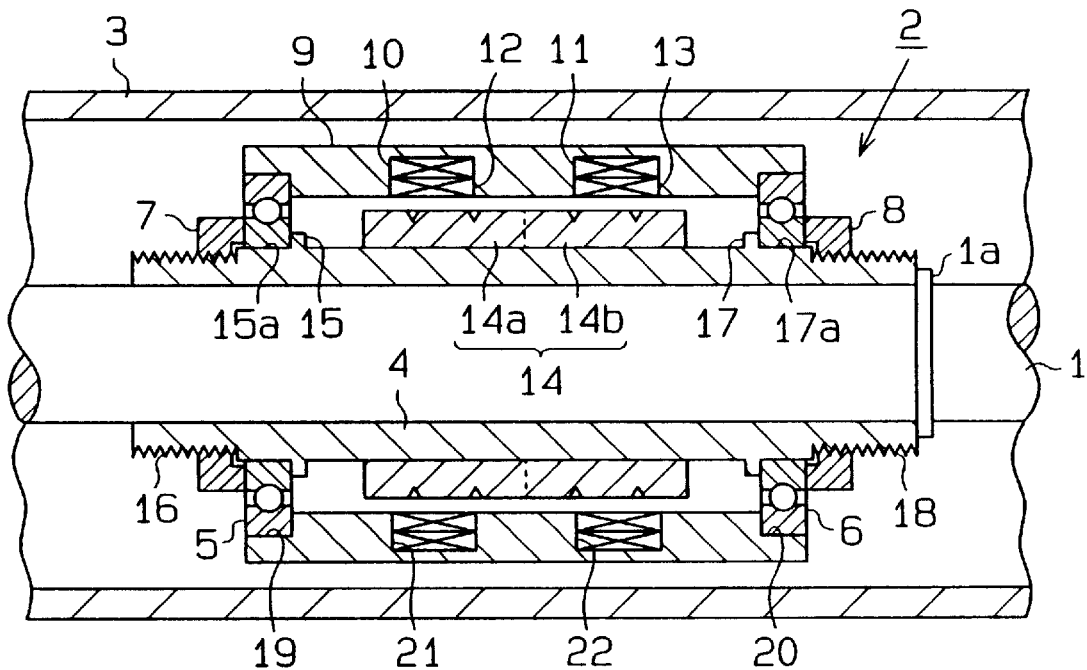
FIG. 1 is a cross-sectional view illustrating a magnetostrictive torque sensor according to a first embodiment of the present invention.

FIG. 1 is a cross-sectional view illustrating a magnetostrictive sensor 2 attached to a shaft 1. A shaft housing 3 covers the shaft 1 and the sensor 2. The torque sensor 2 includes a sleeve 4, bearings 5, 6, annular nuts 7, 8, a stator 9, exciting coils 10, 11 and detecting coils 12, 13. The shaft 1 is rotatably supported in the housing 3 by bearings (not shown). The sleeve 4 is fitted about the shaft 1. A ring 1a is formed on the circumference of the shaft 1 to determine the axial position of the sleeve 4. Accordingly, the axial position of the sensor 2 is determined.

A magnetostrictive layer 14 is located in the axially central portion of the sleeve 4. The layer 14 is divided into two segments 14A, 14B by an imaginary plane perpendicular to the axis of the shaft 1. The layer is made of magnetoelastic material. Magneto-elastic material refers to material that changes its magnetic energy (for example, permeability) in accordance with changes in given elastic energy (the product of force and deformation). The layer 14 is formed by thermal spraying or electroplating a soft magnetic material having high permeability.

As shown in FIG. 1, a first collar 15 is formed on the surface of the sleeve 4 near the left end (as viewed in FIG. 1). A part of the sleeve 4 located axially outside the collar 15 defines a bearing support 15a. A threaded portion 16 is formed outside the bearing support 15a. The outer diameter of the threaded portion 16 is smaller than the inner diameter of the bearing 5. The bearing 5 is press fitted about the bearing support 15a and contacts the first collar 15. The circular nut 7 is screwed to the threaded portion 16. The nut 7 presses the bearing 5 against the first collar 15.

Likewise, a second collar 17 is formed on the surface of the sleeve 4 near the right end (as viewed in FIG. 1). A part of the sleeve 4 located axially outside the collar 17 defines a bearing support 17a. A threaded portion 18 is formed outside the bearing support 17a. The outer diameter of the threaded portion 18 is smaller than the inner diameter of the bearing 6. The bearing 6 is press fitted about the bearing support 17a and contacts the collar 17. The circular nut 8 is screwed to the threaded portion 18. The nut 8 presses the bearing 6 against the collar 17.

The stator 9 is coupled to the shaft housing 3 by connecting means (not shown). The connecting means prevents the cylinder 9 from rotating relative to the housing 3. Annular steps 19, 20 are formed in each end of the cylinder 9. A first bearing 5 is fitted to the first step 19 and a second bearing 6 is fitted to the second step 20. Therefore, the first bearing 5 is axially fixed by the first collar 15 and the first nut 7 and is held between the bearing support 15a and the step 19. Likewise, the second bearing 6 is axially fixed by the second collar 17 and the second nut 8 and is held between the bearing support 17a and the step 20.

First and second annular grooves 21, 22 are formed in the inner wall of the stator 9. The first groove 21 faces the first segment 14a of the magnetostrictive layer 14 and the second groove 22 faces the second segment 14b. The first groove 21 accommodates the first exciting coil 10 and the first detecting coil 12 and the second groove 22 accommodates the second exciting coil 11 and the second detecting coil 13. The first detecting coil 12 is located radially inside of the first exciting coil 10. Likewise, the second detecting coil 13 is located radially inside of the second exciting coil 11. The stator 9 is made up with two semi-cylindrical pieces having the identical shapes. When coupling the pieces with each other, the coil pair 10,12 and the coil pair 11, 13 are fitted in the grooves 21, 22.

The operation of the sensor of FIG. 1 will now be described.

The collars 15, 17 prevent the bearings 5, 6 from moving toward the axial center of the sleeve 4. The nuts 7, 8 press the bearings 5, 6 against the collars 15, 17. The nuts 7, 8 thus prevent the bearings 5, 6 from moving toward the ends of the sleeve 4. The stator 9 is rotatably supported on the sleeve 4 by the bearings 5, 6. The stator 9 is therefore prevented from moving axially by the collars 15, 17 and the nuts 7, 8.

Grooves are formed on the segments 14a, 14b. The grooves on the segments 14a are inclined relative to the axis and the grooves on the segments 14b are also inclined relative to the axis in a direction opposite to the inclination of the grooves on the segment 14a. Torque applied to the shaft 1 deforms, or strains, the segments 14a, 14b. Specifically, a torque in a direction generates a compressive force in one of the segments 14a, 14b and a tensile force in the other segment. A torque in the opposite direction inverts the compressive force and the tensile force in the segments 14a, 14b. A compressive force decreases the permeability of a segment and a tensile force increases the permeability of the segment.

A difference between the permeabilities of the segments 14a, 14b results in a difference between flux that runs from the exciting coil 10 to the detecting coil 12 through the segment 14a and flux that runs from the exciting coil 11 to the detecting coil 13 through the segment 14b. Accordingly, voltage induced in the coil 12 is different from voltage induced in the coil 13. The voltage difference is sensed by a conventional detection circuit (not shown) located on the cylinder 9. The detection circuit detects the torque applied to the shaft 1 based on the voltage difference.

The axial positions of the coil pairs 10, 12 and 11, 13 are fixed relative to the corresponding segments 14a, 14b. Therefore, when no torque is applied to the shaft 1, the voltage difference is zero, which is a normal value. When a torque is applied to the shaft 1, the voltage difference between the coils 12 and 13 is always maintained to a normal value, which corresponds to the applied torque. Therefore, the voltage difference always corresponds to a torque applied to the shaft 1. In other words, the detection accuracy of the sensor 2 is always high.

The torque sensor 2 has the following advantages.

(1) Dimensional variations of the bearings 5, 6 and the sleeve 4 may result in the inner diameter of the bearings 5, 6 being larger than the outer diameter of the sleeve 4. In this case, the bearings 5, 6 are loosely fitted about the bearing supports 15a, 17a. However, the axial positions of the bearings 5, 6 are determined by the collars 15, 17 formed near the ends of the sleeve 4. The bearings 5, 6 are also pressed against the collars 15, 17 by the nuts 7, 8, which are located at the ends of the sleeve 4. In other words, the nuts 7, 8 constantly cause the bearings 5, 6 to contact the collars 15, 17. This construction prevents the bearings 5, 6 from being displaced axially during use of the sensor. The segments 14a, 14b are therefore constantly located at the predetermined axial positions in relation to the coil pairs 10, 12 and 11, 13. As a result, the detection accuracy of the sensor 2 is not degraded with time but is always high.

(2) The bearings 5, 6 are pressed against the collars 15, 17 by the circular nuts 7, 8 screwed to the threaded portions 16, 18 formed on the sleeve 4. This causes the bearings 5, 6 to constantly contact the collars 15, 17. Therefore, the positions of the bearings 5, 6 are determined by simply screwing the nuts 7, 8. This results in reduced number of manufacturing steps.

A second embodiment of the present invention will now be described with reference to FIGS. 3 and 4.

Figure 2:
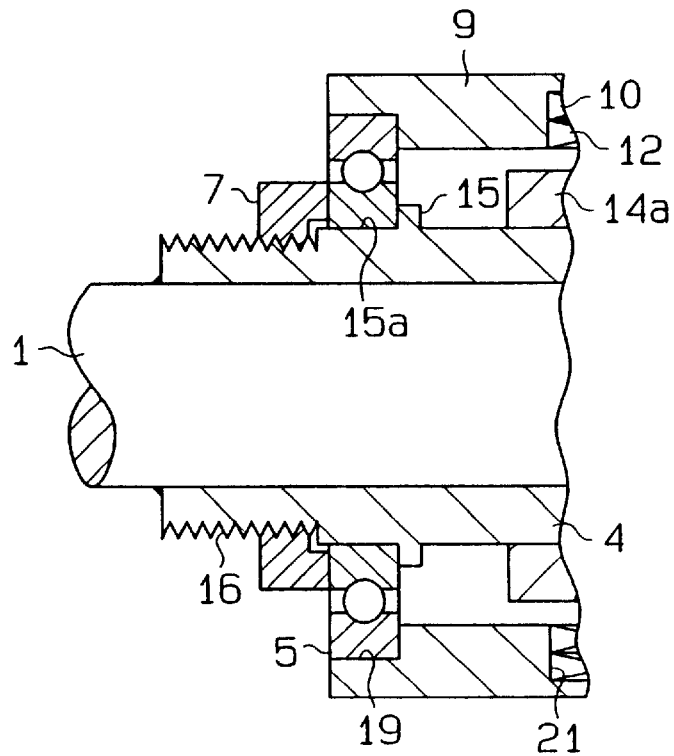
FIG. 2 is an enlarged partial cross-sectional view illustrating the torque sensor of FIG. 1.
Figure 3:
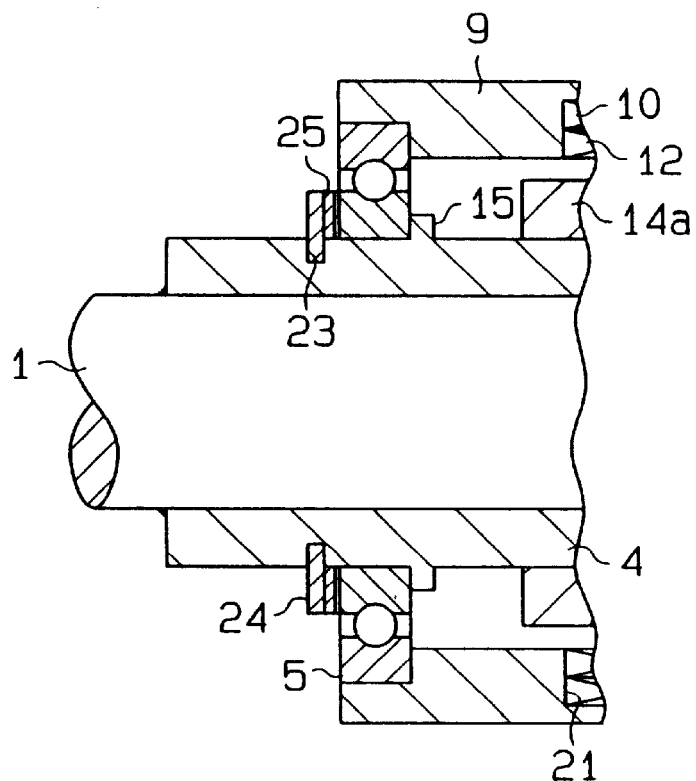
FIG. 3 is an enlarged partial cross-sectional view illustrating a magnetostrictive torque sensor according to a second embodiment of the present invention.

In the embodiment of FIGS. 3 and 4, means for pressing the bearings 5, 6 against the collars 15, 17 is different from that of the embodiment of FIGS. 1, 2. Specifically, the threaded portions 16, 18 of the sleeve 4 and the circular nuts 7, 8 are replaced with snap rings 24 fitted to annular grooves 23 and annular springs, or washers 25. Therefore, like or the same reference numerals are given to those components that are like or the same as the corresponding components of the embodiment of FIGS. 1 and 2.

As shown in FIG. 3, the annular groove 23 is formed axially outside the collar 15. The snap ring 24 is fitted to the groove 23. The snap ring 24 is, for example, a C-shaped snap ring. The washer 25 is located between the snap ring 24 and the bearing 5, which contacts the collar 15.

The washer 25 is formed by pressing an annular metal plate and has corrugation. The washer 25 therefore has compression elasticity. The washer 25 contacts the snap ring 24 and the bearing 5 at its ridges and pushes the bearing 5 away from the snap ring 24.

At the other end of the sleeve 4 that is not shown in the drawings, a groove like the groove 23 is formed axially outside the collar 17 and a snap ring like the snap ring 24 is fitted to the groove. A washer like the washer 25 is located between the snap ring and the bearing 6 to press the bearing 6 against the collar 17.

The bearings 5, 6 are held between the collars 15, 17 and the snap rings 24 by the force of the washers 25. This construction prevents the bearings 5, 6 from being axially displaced in relation to the sleeve 4 thereby maintaining the axial position of the stator 9 in relation with the sleeve 4.

Figure 4A:
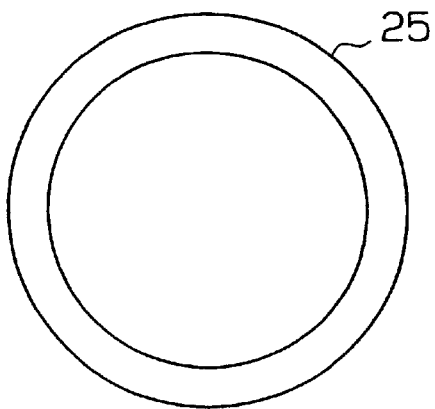
FIG. 4(*a*) is a front view illustrating a wavy spring washer.
Figure 4B:
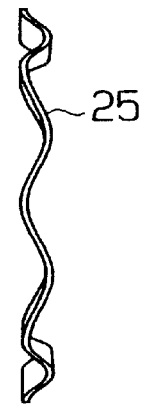

In addition to the advantage (1) of the embodiment of FIGS. 1 and 2, the torque sensor of FIGS. 3, 4(a) and 4(b) has the following advantages.

(3) The washers 25 are located between the bearings 5, 6 and the snap rings 24, which are fitted to the grooves 23, and press the bearings 5, 6 against the collars 15, 17. Therefore, necessary machining for determining the position of the bearings 5, 6 is the formation of the grooves 23 on the sleeve 4. This reduces the number of manufacturing steps.

(4) The corrugated spring washers 25 are located between the snap ring 24 and the bearings 5, 6. Compared to simple spring washers, the corrugated washers 25 contact the bearings 5, 6 at greater number of points thereby pushing the bearings 5, 6 against the collars 15, 17 by urging force that is equally distributed on the washers 25. Thus, as in the embodiment of FIGS. 1 and 2, the bearings 5, 6 are prevented from being inclined with respect to the axis of the sleeve 4.

A third embodiment according to the present invention will now be described with reference to FIGS. 5–7.

Figure 5:
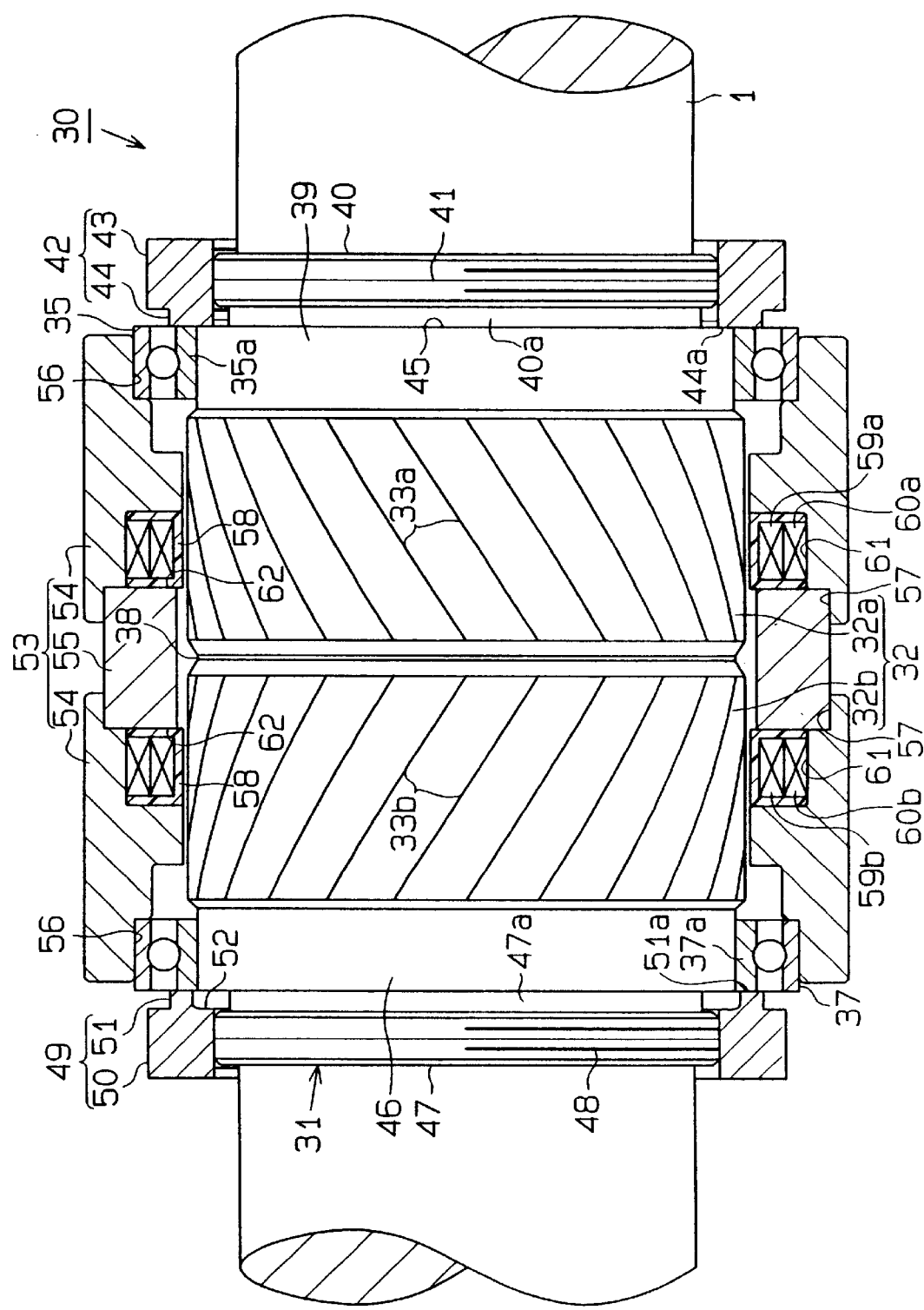
FIG. 5 is a cross-sectional view illustrating a magnetostrictive torque sensor according to a third embodiment of the present invention.

FIG. 5 is a cross-sectional view illustrating a magnetostrictive sensor 30 attached to a shaft 1.

The sensor 30 includes a cylindrical sleeve 31 fitted about the shaft 1. The sleeve 31 includes a body 38, threaded portions 41, 48 formed at the ends of the body 38 and couplers 40a, 47a that couple the threaded portions 41, 48 with the body 38.

A magnetostrictive layer 32 is located in the axially central portion of the sleeve body 38. The layer 32 is made of a material having magnetoelasticity (for example, a soft magnetic material having a high magnetic permeability). Magnetoelastic material refers to a material that has magnetostriction effect when slightly strained by torque. The layer 32 is divided into two segments 32a, 32b at the axial center. The segments 32a, 32b each have grooves 33a, 33b. The grooves 33a formed in the first segment 32a are equally spaced apart and are inclined by forty-five degrees relative to the axis of the sleeve 31. Similarly, the grooves 33b formed in the second segment 32b are equally spaced apart and are inclined by minus forty-five degrees relative to the sleeve axis. The grooves 33a and the grooves 33b do not intersect with each other.

A part of the body 38 between the first coupler 40a and the first segment 32a defines a first bearing support 39. Likewise, a part of the body between the second coupler 47a and the second segment 32b defines a second bearing support 46. A first bearing 35 is fitted about the first bearing support 39 and a second bearing 37 is fitted about the second bearing support 46.

The outer diameters of the first and second threaded portions 41, 48 are smaller than that of the sleeve body 38. A first nut 42 is screwed to the first threaded portion 41 and a second nut 49 is screwed to the second threaded portion 48. As illustrated in FIG. 6, the first nut 42 has a generally hexagonal cross-section and thus has six sides 43. Angles defined by each pair of adjacent sides 43 are cut away at an end of the nut 42 to form an annular portion 44. The side of the annular portion 44 defines an annular contact surface 44a. When the first nut 42 is threaded to the threaded portion 41, the contact surface 44a contacts the entire side surface of a inner ring 35a of the first bearing 35. The contact surface 44a also contacts a step 45, which is defined by the first coupler 40a and the first bearing support 39. Therefore, the axial position of the first bearing 35 relative to the sleeve 31 is determined by the first nut 42.

The second nut 49 is formed identical with the first nut 42. That is, the second nut 49 has the same outer diameter and thickness as those of the first nut 42. As illustrated in FIG. 7, the second nut 49 has six sides 50. Angles defined by each pair of adjacent sides 50 are cut away at an end of the nut 49 to form an annular portion 51.

The side of the annular portion 51 defines an annular contact surface 51a. The contact surface 51a contacts the entire side surface of a inner ring 37a of the second bearing 37. The opening of the nut 49 defined by the contact surface 51a is enlarged to define a step 52. The diameter of the step's axial wall is larger than the outer diameter of the second bearing support 46. Therefore, the contact surface 51a contacts the inner ring 37a of the second bearing 37 and does not contact the second bearing support 46. The axial movement of the nut 49 is not limited by a step defined by the coupler 47a and the bearing support 46. When screwed to the second threaded portion 48, the second nut 49 pushes the second bearing 37 toward the first bearing 35.

A stator 53 is located about the sleeve 31. The stator 53 is held between outer rings of the first and second bearings 35, 37. The axial position of the stator 53 in relation to the sleeve 31 is determined, accordingly.

The stator 53 includes two generally cylindrical stator pieces 54 and a coupling ring 55. The first and second stator pieces 54 are formed by machining cylindrical material. The first stator piece 54 has a first annular step 56 defined at one end and a second annular step 57 defined at the other end.

A third annular step 61 is defined adjacent to the second step 57. The axial walls of the steps 56, 57, 61 have different diameters.

The outer rings of the first and second bearings 35, 37 are fitted in the first steps 56. The first steps 56 prevent the first and second bearing 35, 37 from being displaced toward the axial center of the stator 53. A coupling ring 55 is fitted in the second steps 57 to couple the stator pieces 54.

A bobbin 58 is located between each third step 61 and each end face of the coupling ring 55. An exciting coil 59a and a detecting coil 60a are wound about one of the bobbins 58 and an exciting coil 59b and a detecting coil 60b are wound about the other bobbin 58.

The operation of the torque sensor of FIGS. 5–7 will now be described.

Assembly of the torque sensor 30 will now be described. First, the stator 53 is provided about the sleeve 31. In this state, the first bearing 35 and the second bearing 37 are fitted to the bearing supports 39 and 46 to support the cylinder 53. Subsequently, the first nut 42 is screwed to the first threaded portion 41 such that the contact surface 44a contacts the step 45. The first nut 42 determines the axial position of the bearing 35.

Next, the second nut 49 is screwed to the second threaded portion 48. The second nut 49 pushes the second bearing 37 toward the first nut 42. Further, the second nut 49 pushes the cylindrical stator 53 toward the first nut 42 through the second bearing 37 and also presses the first bearing 35 against the first nut 42 through the cylindrical stator 53.

Consequently, the first bearing 35 and the step 45 are aligned. In this manner, the axial positions of the bearings 35, 37 are determined with the step 45 as a referential position by screwing the first and second nuts 42, 49. Dimensional variations of the bearings 35, 37 and the sleeve 31 may result in the inner diameter of the bearings 35, 37 being larger than the outer diameter of the sleeve 31. In this case, the bearings 35, 37 are loosely fitted about the bearing supports 39, 46. However, the axial positions of the cylindrical stator 53 is fixed in relation to the sleeve 31 by screwing the nuts 42, 49 to the threaded portions 41, 48. Therefore, the stator 53 is maintained at a predetermined axial position in relation to the sleeve 31.

An alternating electric current having a predetermined amplitude and frequency is applied to the exciting coils 59a, 59b. Accordingly, the coils 59a, 59b generate fluxes. The fluxes surround the bobbins 58. The flux generated by the first exciting coil 59a runs through first closed magnetic circuits. The first closed circuits include the left stator piece 54, the magnetostrictive layer 32 and the coupling ring 55. The first exciting coil 59a also generates flux that runs through second closed magnetic circuits. The second circuits are angularly spaced apart along the circumference of the first exciting coil 59a. Each second circuit includes the left stator pieces 54, the first bearing 35, the first nut 42, the sleeve 31 and the coupling ring 55. The fluxes running through the first and second closed magnetic circuits cause the detecting coil 60a to induce electromotive force.

In the same manner, the flux generated by the second exciting coil 59b runs through third closed magnetic circuits. The third closed circuits include the right stator piece 54, the magnetostrictive layer 32 and the coupling ring 55. The second exciting coil 59b also generates flux that runs through fourth closed magnetic circuits. The fourth circuits are angularly spaced apart along the circumference of the second exciting coil 59b. Each fourth circuit includes the right stator piece 54, the second bearing 37, the second nut 47, the sleeve 31 and the coupling ring 55. The fluxes running through the third and fourth closed magnetic circuits cause the detecting coil 60b to induce electromotive force.

When no torque is applied to the shaft 1, the electromotive force induced by the first detecting coil 60a is equal to the electromotive force induced by the second detecting coil 60b. Thus, the difference of the induced electromotive force is zero. Accordingly, the magnitude of the torque is judged to be zero.

Torque applied to the shaft 1 slightly strains the segments 32a, 32b. The direction of the strain depends on the rotational direction of the applied torque. Specifically, a torque in a direction generates a compressive force in one of the segments 32a, 32b and a tensile force in the other segment. For example, when the first segment 32a receives a tensile force, the permeability of the first segment 32a is increased. In this state, the second segment 32a receives compressive force and the permeability of the second segment 32a is decreased. As a result, the first detecting coil 60a induces a greater electromotive force whereas the second detecting coil 60b induces a reduced electromotive force. The magnitude and the direction of the torque applied on the shaft 1 is detected based on the magnitude and the sign of subtraction results of the electromotive forces induced by the detecting coils 60a, 60b.

Fluxes generated during the operation of the sensor 30 to cause the coils 60a, 60b to induce electromotive force are affected by several factors. The factors include different magnetic reluctance at different angular portions of the stator 53, shape difference between the first nut 42 and the second nut 49 and the shape difference at different angular positions in each of the first and second nuts 42, 49. These factors differentiate the inductance in the coils 59a, 60a from that of the coils 59b, 60b thereby degrading the detection accuracy of the sensor 31. However, these factors are eliminated in the embodiment of FIGS. 5–7.

The stators of the embodiments of FIGS. 1, 2 and 3–4(b) are formed by coupling semi-cylindrical pieces and therefore have connections at certain circumferential positions. However the stator 53 of the embodiment of FIGS. 5–7 is made up with three annular members, the cross-sections of which are complete circles. Therefore, the magnetic reluctance of the stator 53 is the same at every angular position.

The first nut 42 and the second nut 49 have the same outer diameter and thickness. This construction eliminates errors in the detection caused by difference between the shapes of the first nut 42 and the second nut 49.

Further, errors caused by shape difference at different angular positions in each of the first and second nuts 42, 49 is eliminated by forming the annular contact surfaces 44a, 51a. If the contact surfaces 44a, 51a are hexagonal, the fluxes through the second and fourth magnetic circuits including the first and second nuts 42, 49 are varied at different angular positions due to the uneven diameter of the nuts 42, 49. However, the fluxes of the second and fourth magnetic circuits pass through the annular contact surfaces 44a, 51a. The fluxes are therefore equalized at all the angular positions.

Figure 6:
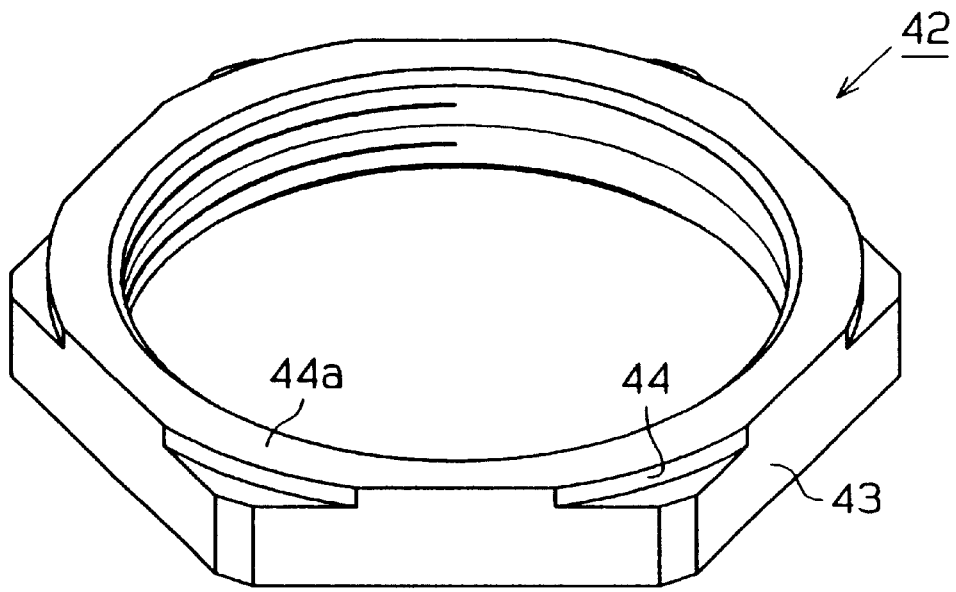
FIG. 6 is a perspective view illustrating a first nut in the sensor of FIG. 5.
Figure 7:
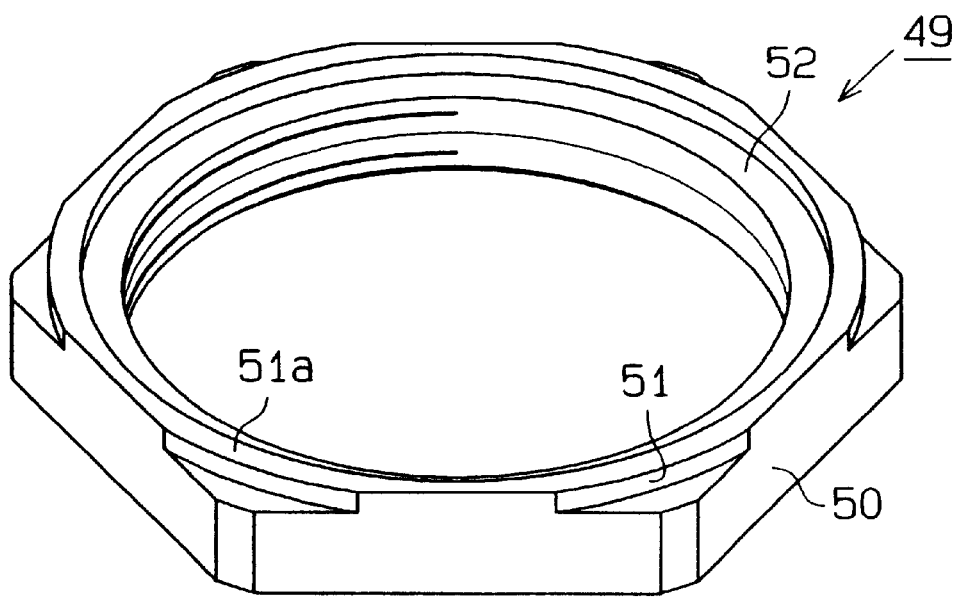
FIG. 7 is a perspective view illustrating a second nut in the sensor of FIG. 5.

In this manner, the embodiment of the FIGS. 5–7 eliminates the factors that affect the generated fluxes thereby suppressing the inductance fluctuations of the exciting coils 59a. 59b. For the same reason, the inductance fluctuations of the detecting coils 60a, 60b are suppressed.

The embodiment of FIGS. 5–7 has the following advantages.

(5) The first and second nuts 42, 49 are screwed to the sleeve 31. The first and second bearings 35, 37 coaxially support the stator 53 about the sleeve 31 to be rotatable relative to the sleeve 31. The nuts 42, 49 hold the cylinder 53 through the bearings 35, 37. Therefore, even if variation of the outer diameter of the sleeve 31 and variations of the inner diameter of the bearings 35, 37 cause the bearings 35, 37 to be loosely fitted about the sleeve 31, the axial position of the cylinder 53 is securely determined and maintained relative to the sleeve 31. As a result, the axial positions of the exciting coils 59a, 59b and the detecting coils 60a, 60b are not displaced relative to the segments 32a, 32b. Therefore, when no torque is applied to the shaft 1, electromotive force induced by the detecting coil 60a is equal to electromotive force induced by the detecting coil 60b. The detection accuracy of the sensor 30 is thus improved.

(6) The first bearing 35 is aligned with the step 45 formed on the sleeve 31. In other words, the position of the cylinder 53 is determined with reference to the step 45. Therefore, when assembling the sensor 30, the axial position of the cylinder 53 is easily determined relative to the sleeve 31.

(7) The body 38 of the sleeve 31 has no grooves or protrusions. Therefore, compared to sleeves having collars, machining of the sleeve 31 out of cylindrical material is easy. Specifically, substantially no machining is needed to form the sleeve body 38 whereas almost the whole surface of a cylindrical material needs to be machined to form a sleeve with collars. Thus, the material is not wasted.

(8) The stator 53 includes three annular parts, namely the stator pieces 54 and the coupling ring 55. Therefore, the magnetic reluctance of the stator 53 is equalized along its circumference. This improves the detection accuracy of the sensor 30.

(9) The first nut 42 and the second nut 49 have the same outer diameter and the same thickness. Further, the surfaces 44a, 51a of the first and second bearings 35, 37 contacting the bearings 35, 37 are formed annular. The magnitudes of fluxes through the closed magnetic circuits including the first nut 42 and the second nut 49 are equalized at every angular position of the exciting coils 59a, 59b. This improves the detection accuracy of the sensor 30.

(10) The first and second nuts 42, 49 are hexagonal nuts having six sides 43, 50. When assembling the sensor 30, the nuts 42, 49 are easily and firmly fastened by a spanner. Therefore, the nuts 42, 49 are not loosened during use of the sensor 30.

The present invention may be alternatively embodied in the following forms:

In the embodiments of FIGS. 1, 2 and 3–4(b), steps 19, 20 are formed in the stator 9. The bearings 5, 6 are fitted to the steps 19, 20 to hold the stator 9 thereby determining the axial position of the stator 9 relative to the sleeve 4. Instead of the steps 19, 20, grooves may be formed in the inner wall of the stator 9 near each end and the bearings 5, 6 may be fitted into the grooves.

This construction allows the bearings 5, 6 to determine the axial position of the stator 9.

In the illustrated embodiments, the stators may be made of nonmagnetic material. Such stator only functions to support coils and magnetic circuits are not formed in the stator. In this case, an annular flux guide made of magnetic material may be provided about each coil pair of an exciting coil and a detecting coil, which are accommodated in the inner wall of the stator.

In the illustrated embodiments, the outer diameter of the shafts may be smaller than the inner diameter of the sleeves at a part corresponding to the magnetostrictive layer. That is, part of each shaft may be formed like a torsion bar. This construction improves the detection accuracy of the sensor.

In the embodiment of FIGS. 1 and 2, the annular nuts 7, 8 may be replaced with nuts of other types (for example, hexagonal nuts or jam nuts). When nuts other than jam nuts are employed, double nuts or locking agent is preferably used for preventing the nuts from loosening.

Figure 8A:
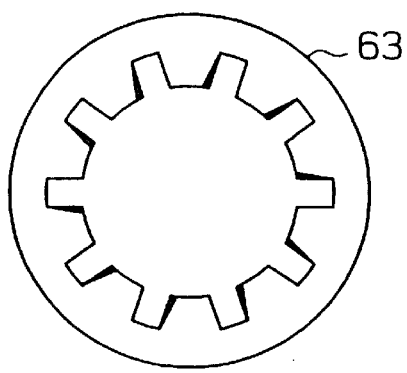
FIG. 8(*a*) is a front view illustrating a washer having inner teeth.
Figure 8B:
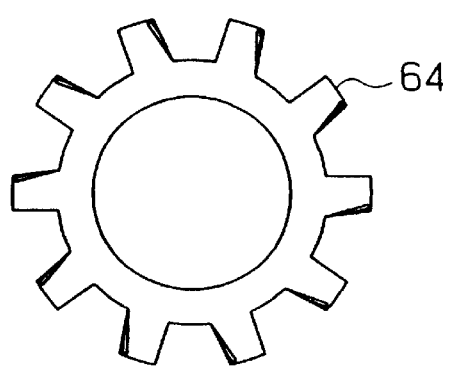

In the embodiment of FIGS. 3–4(b), the washers 25 may be replaced with annular spring members such as wave washers, spring washers and conical spring washers. Alternatively, the washers 25 may be replaced with toothed washers such as washers having inner teeth as shown in FIG. 8(a), washers having outer teeth as shown in FIG. 8(b) or washers having inner and outer teeth.

In the embodiment of FIGS. 3–4(b), the C-shaped snap rings 24 may be replaced with C-shaped snap rings having a uniform cross-section, E-shaped snap rings or a U-shaped clips. When using a U-shaped clip, the annular grooves 23 may be replaced with two pairs of grooves formed at opposite sides of the shaft 1.

In the embodiments of FIGS. 1–4(b), each of the collars 15, 17 may be replaced with a plurality of protrusions that are formed along a single circumference.

In the embodiment of FIGS. 5–7, the contact surface 44a of the first nut 42 aligns the first bearing 35 with the step 45 formed on the sleeve 31 thereby determining the axial position of the stator 53. The axial position of the step 45 is such that the sensitivities of the detecting coils 60a, 60b are equalized with no torque applied to the shaft 1. The first nut 42 may be replaced with a nut having the same shape as the second nut 49, which has a step 52. In this case, the axial position of the stator 53 is not determined by the step 45. Instead, the axial position of the stator 53 is determined by adjusting screwing amount of the nuts such that the sensitivities of the coils 60a, 60b are equalized.

In the embodiment of FIGS. 5–7, a collar as in the embodiments of FIGS. 1–4(b) may be formed on the first bearing support 39 and the first nut 42 may be replaced with a nut having the same shape as the second nut 49, which has a step 52. In this case, the axial position of the first bearing 35 is determined by pressing the bearing 35 against the collar by screwing the nut.

Figure 9A:
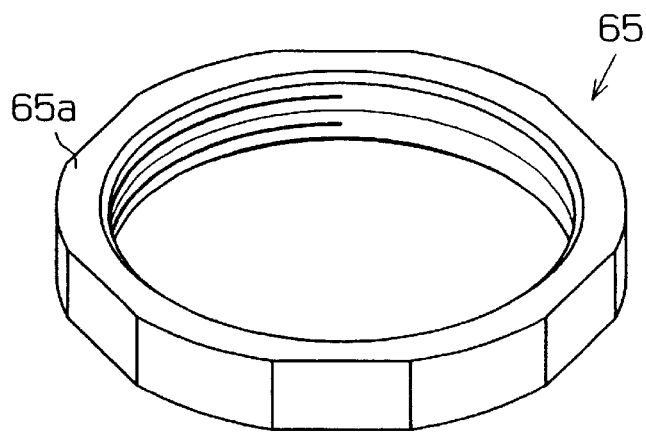
FIG. 9(*a*) is a perspective view illustrating a first nut according to another embodiment.
Figure 9B:
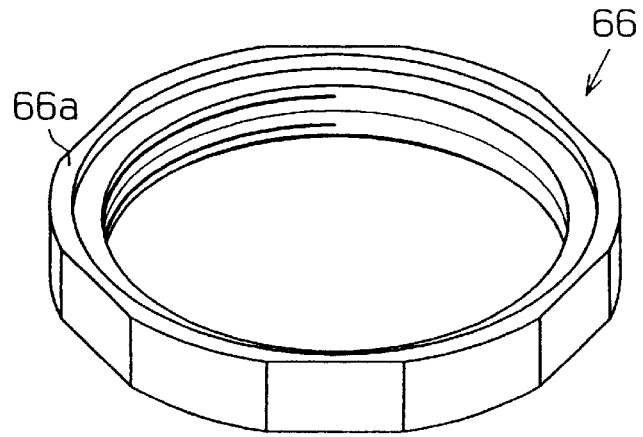

In the embodiment of FIGS. 5–7, the first nut 42 may be replaced with a nut 65 illustrated in FIG. 9(a). The cross-section of the nut 65 is the same as the cross-section of the cylindrical portion 44 of the first nut 42. The nut 65 is also has a contact surface 65a that contacts the entire end face of the inner ring 35a of the first bearing 35. Likewise, second nut 49 may be replaced with a nut 66 shown in FIG. 9(b). The cross-section of the nut 66 is the same as the cross-section of the cylindrical portion 51 of the second nut 49. The nut 66 is also has a contact surface 66a that contacts the entire end face of the inner ring 37a of the second bearing 37. The shape of the nuts 65, 66 are relatively cylindrical. The nuts 65, 66 therefore have relatively equalized magnetic reluctance along its circumference. The fluxes generated by the exciting coils 59a, 59b thus receive relatively equalized along its circumference. As a result, inductance fluctuation of the detecting coils 60a, 60b caused by rotation of the sleeve 31 relative to the stator 53 is reduced. The detection accuracy of the sensor is improved, accordingly.

In the embodiment of FIGS. 5–7, the first and second nuts 42, 49 may be replaced with circular nuts, which are fastened with a hook spanner. This construction also reduces inductance fluctuation the detecting coils 60a, 60b caused by rotation of the sleeve 31 relative to the stator 53. The detection accuracy of the sensor is improved, accordingly.

In the embodiment of FIGS. 5–7, the stator 53 is directly supported by the first and second bearings 35, 37. However, a support member may be located between the stator 53 and the first bearing 35 and between the stator 53 and the second bearing 37.

Figure 10:
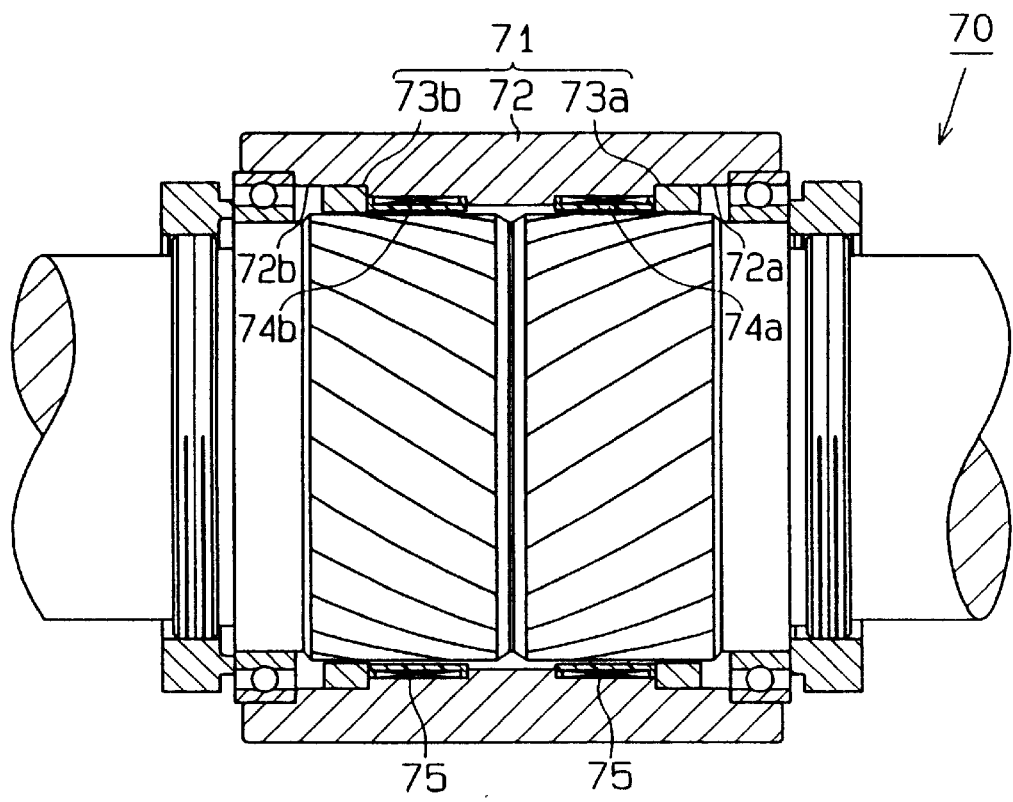
FIG. 10 is a partially cutaway view illustrating a magnetostrictive sensor according to another embodiment.
Figure 11:
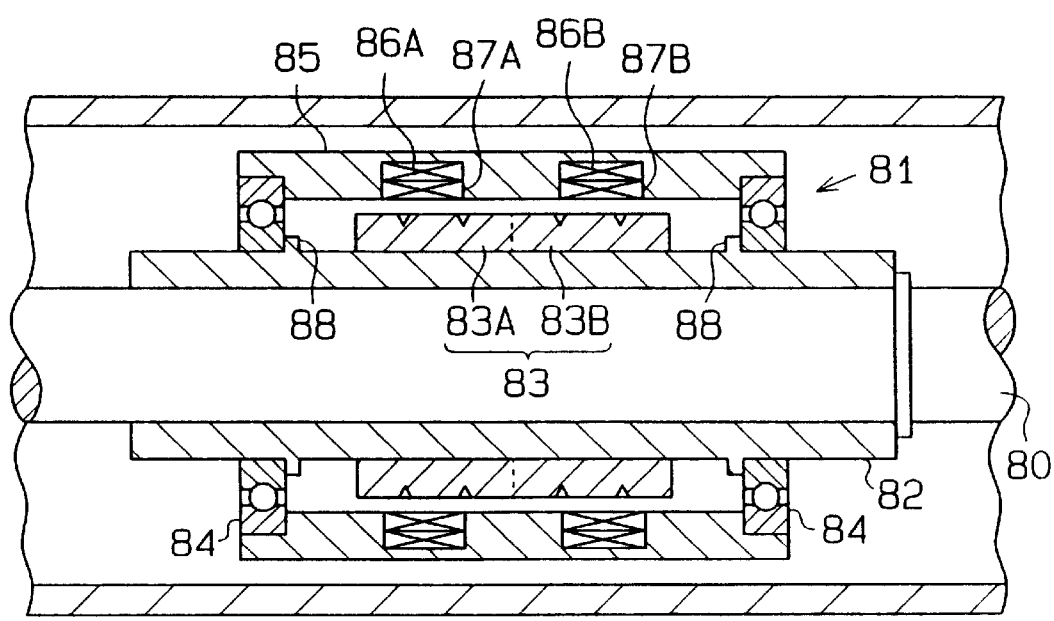
FIG. 11 is a cross-sectional view illustrating a prior art magnetostrictive sensor.

In the embodiment of FIGS. 5–7, the stator 53 may be replaced with a stator 71 illustrated in FIG. 10. The stator 71 includes a stator body 72 and stator rings 73a, 73b. The stator body 72 is symmetric with respect to a plane perpendicular to the axis of the shaft 1 and includes several steps formed in its inner wall. The stators 73a, 73b are fitted to steps 72a, 72b to define coil accommodating grooves 75. Magnetostriction detecting coils 74a, 74b are accommodated in the grooves 75. This construction also reduces inductance fluctuation of the coils 74a, 74b caused by rotation of the sleeve relative to the stator 72. The detection accuracy of the sensor is improved, accordingly.

In the embodiments of FIGS. 1–4(b), the exciting coils 10, 11 (59a, 59b) and the detecting coils 12, 13 (60a, 60b) may be replaced with two magnetostriction detecting coils, each corresponding to one of the segments 14a, 14b (32a, 32b). Each magnetostriction detecting coil detects a phase difference between a current and an alternating voltage through the coil. The magnitude and the direction of the torque are detected based on the difference between the phase differences detected by the coils. This method takes advantages of the fact that the phase difference between a current and an alternating voltage is changed by inductance variation generated by torque changes.

Applied torque may alternatively be detected in the following manner. That is, alternating voltage is applied to each magnetostriction detection coil. Then, the voltage and the current of each coil are detected and the electric power of the coil is computed based on the detected current and voltage. The torque is detected based on the difference between the electric powers of the coils. This embodiment also takes advantages of the fact that the phase difference between a current and an alternating voltage is changed by inductance variation generated by torque changes. In other words, this embodiment takes advantage of the fact that the electric power, which is the product of voltage and current, is changed by inductance variation generated by torque changes.

Therefore, the present examples and embodiments are to be considered as illustrative and not restrictive and the invention is not to be limited to the details given herein, but may be modified within the scope and equivalence of the appended claims.

What is claimed is:

1. A torque sensor provided on a shaft to detect the direction and the magnitude of a torque applied to the shaft, the sensor comprising:
    a support fixed to the shaft, wherein a magnetostrictive layer is formed on the support, the magnetostrictive layer having a magnetostriction effect in accordance with torque applied to the shaft;
    a pair of positioners formed on the support, the positioners being axially spaced from one another;
    a pair of bearings fitted to the support, wherein each bearing contacts one of the positioners;
    a pair of exciting coils;
    a pair of detecting coils;
    a stator member for supporting the exciting coils and the detecting coils such that the the exciting coils and the detecting coils surround and face the magnetostrictive layer, wherein the axial position of the stator member is determined by the bearings which hold the stator therebetween, and wherein the shaft is rotatable relative to the stator member, and the coils operate to detect torque applied to the shaft; and
    urging means for providing support to fix the axial position of the bearings by pressing the bearings axially against the positioners.

2. The torque sensor according to claim 1, wherein the urging means includes:
    a pair of threaded portions formed on the support at positions axially outside of the positioners; and
    nuts threaded to the threaded portions to urge the bearings toward the positioners.

3. The torque sensor according to claim 1, wherein the urging means includes;
    a groove formed in a circumferential surface of the support, wherein the groove is located at a position axially outside of one of the positioners;
    a stopper fitted to the groove, wherein the stopper is fixed in the axial direction by the groove;
    a spring located between the stopper and the corresponding bearing to urge the bearing toward the corresponding positioner.

4. The torque sensor according to claim 1, wherein the magnetostrictive layer is made of magneto-elastic material and includes:
    first and second segments, wherein one segment is formed on each side of a central axis of the magnetostrictive layer; and
    a plurality of grooves formed on the segments, and wherein the grooves are equally spaced apart.

5. The torque sensor according to claim 4, wherein half of the grooves are formed on the first segment and are inclined by forty-five degrees relative to the central axis, and wherein the other half of the grooves are formed on the second segment and are inclined by minus forty-five degrees relative to the central axis.

6. The torque sensor according to claim 1, wherein a limiter is formed on the circumferential surface of the shaft to contact the support thereby determining the axial position of the support.

7. The torque sensor according to claim 2, each threaded portion having an outer diameter and each bearing having an inner diameter, wherein the outer diameter of the threaded portions is smaller than the inner diameter of the bearings.

8. A torque sensor comprising:
    a magnetostrictive member fitted about a shaft, wherein the member includes a magnetostrictive portion that has a magnetosriction effect in accordance with torque applied to the shaft, and wherein the member has first and second end portions;
    a radial first bearing fitted about the first end portion of the member, wherein the first bearing includes an inner ring and an outer ring;
    a radial second bearing fitted about the second end portion of the member, wherein the second bearing includes an inner ring and an outer ring;
    a cylindrical stator, wherein the first and second bearings hold the stator therebetween to fix the axial position of the stator relative to the shaft, and wherein the magnetostrictive member and the shaft rotate relative to the stator;
    at least two magnetostriction detecting coils, each coil housed by the stator to surround the magnetostrictive portion;

a first threaded portion formed on the first end portion, wherein an axis of the first threaded portion is aligned with an axis of the magnetostrictive member, and wherein a first nut is threaded to the first threaded portion to urge the inner ring of the first bearing toward the second end portion; and a second threaded portion formed on the second end portion, wherein an axis of the second threaded portion is aligned with an axis of the magnetostrictive member, and wherein a second nut is threaded to the second threaded portion to urge the inner ring of the second bearing toward the first end portion.

9. The torque sensor according to claim 8, wherein a positioning surface is formed on the first end portion of the magnetostrictive member to limit movement of the first nut toward the second end portion, and wherein the inner ring of the first bearing is axially fixed relative to the magnetostrictive member by the first nut when the second nut is tightened toward the second bearing.

10. The torque sensor according to claim 9, wherein the magnetostrictive member is formed cylindrically and has a body on which the magnetostrictive portion is formed, and wherein:

the outer diameter of the first threaded portion is smaller than the inner diameter of the inner ring of the first bearing; and the outer diameter of the second threaded portion is smaller than the inner diameter of the inner ring of the second bearing.

11. The torque sensor according to claim 10, wherein the first nut contacts the positioning surface and the inner ring of the first bearing, and wherein the second nut contacts the inner ring of the second bearing.

12. The torque sensor according to claim 11, the first and second nuts having a diameter and a thickness, wherein the first and second nuts have substantially the same diameter and the same thickness, and wherein the first nut contacts an end surface of the inner ring of the first bearing and the second nut contacts an end surface of the inner ring of the second bearing.

13. The torque sensor according to claim 8, wherein the stator includes first, second, third annular stator pieces coupled one another, wherein the first and third stator pieces are coupled to opposite ends of the second stator piece, and wherein a first annular space is defined between the first and second stator pieces and a second annular space is defined between the second and third stator pieces, and wherein the magnetostriction detecting coils are housed in the first and second annular spaces, respectively.

14. A torque sensor for installation on a rotatable shaft comprising:

a magnetostrictive layer fixed to a section of the surface of the shaft;

a first bearing and a second bearing attached to the shaft, each bearing having an inner ring, wherein the magnetostrictive layer lies between the first and second bearings;

a sleeve-shaped stator member supported by the bearings coaxially to the shaft such that the shaft rotates relative to the stator member;

an exciting coil and a detecting coil housed by the stator member such that the coils surround the magnetostrictive layer;

an urging means for engaging and pressing the inner ring of the first bearing axially toward the second bearing; and a positioning means for engaging an end surface of the inner ring of the second bearing and for determining the axial position of the inner ring of the second bearing.

15. A torque sensor according to claim 14, wherein the positioning means is a nut that is fixed to the shaft by threads.

16. A torque sensor according to claim 15, wherein the nut is a second nut, and wherein the urging means is a first nut that applies a force to the inner ring of the second bearing when tightened.

17. A torque sensor according to claim 14, wherein the positioning means includes a positioner collar located on an inner side of each bearing, and wherein the urging means includes means for applying force to an outer side of each inner ring.

* * * * *

UNITED STATES PATENT AND TRADEMARK OFFICE
CERTIFICATE OF CORRECTION

PATENT NO. : 6,237,428 B1
DATED : May 29, 2001
INVENTOR(S) : Yasuharu Odachi et al It is certified that error appears in the above-identified patent and that said Letters Patent is hereby corrected as shown below:

Column 12,
Line 51, please change "has a magnetosriction effect" to -- has a magnetostriction effect --;

Signed and Sealed this

Thirtieth Day of April, 2002

*Attest:*

JAMES E. ROGAN
*Attesting Officer*   *Director of the United States Patent and Trademark Office*